No. 850,219. PATENTED APR. 16, 1907.
J. L. FRAZIER.
CAR COUPLING.
APPLICATION FILED JUNE 5, 1905. RENEWED AUG. 13, 1906.

Witnesses:

Inventor:
James L. Frazier,
By L. N. Thurlow,
Atty.

UNITED STATES PATENT OFFICE.

JAMES L. FRAZIER, OF PEORIA, ILLINOIS, ASSIGNOR, BY MESNE ASSIGNMENTS, TO GRAVITY COUPLER COMPANY, A CORPORATION OF ILLINOIS.

CAR-COUPLING.

No. 850,219.

Specification of Letters Patent.

Patented April 16, 1907.

Application filed June 5, 1905. Renewed August 13, 1906. Serial No. 330,489.

*To all whom it may concern:*

Be it known that I, JAMES L. FRAZIER, a citizen of the United States, residing at Peoria, in the county of Peoria and State of Illinois, have invented certain new and useful Improvements in Car-Couplings; and I do hereby declare that the following is a full, clear, and exact description of the invention, which will enable others skilled in the art to which it appertains to make and use the same.

This invention has reference to couplings for use on mining-cars, cars for hauling dirt in contracting-work, and other like purposes where a quick and safe coupling is needed.

The object of the invention is to improve couplings of this character in general.

A further object is to provide a coupling of the simplest and fewest number of parts.

A further object is to provide a coupling with a locking member that will release itself from its companion member by its own weight when desired.

Another object is to provide a coupling of two interlocking members and a third rotatable member for holding the said first two members in locked relation and likewise for permitting their separation.

Another object is to prevent the parting of the interlocking members of a coupling by means of a gravity-operated locking device.

Figure 1:
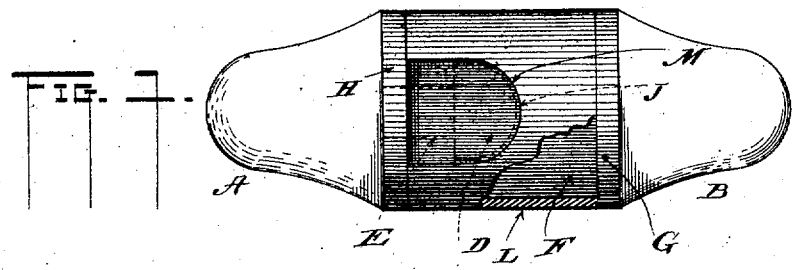
Figure 2:
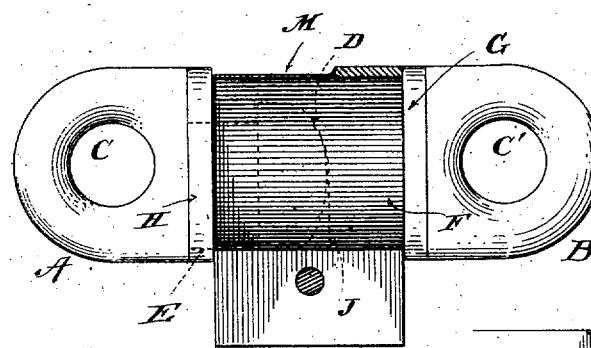
Figure 4:
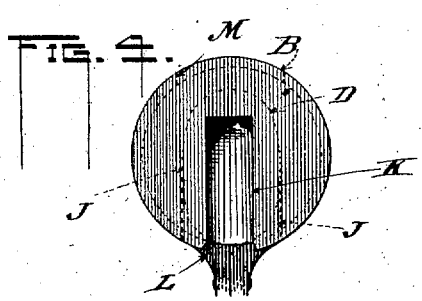
Figure 3:
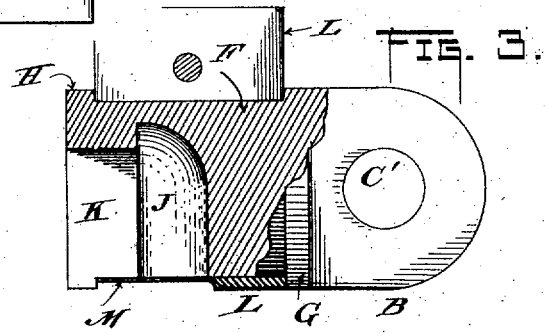
Figure 5:
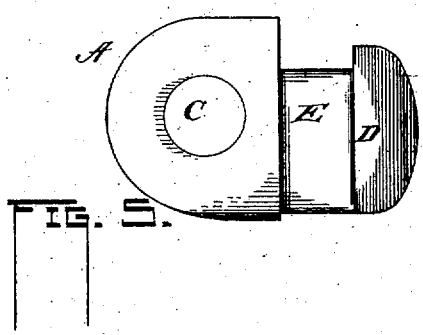
Figure 6:
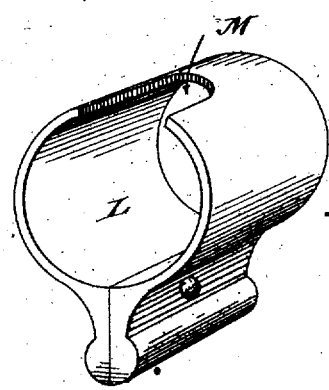

In the appended drawings, Figure 1 is a top view of my improved coupling with a portion of a locking device broken away. Fig. 2 is a side view of the device, showing the locking device in section. Fig. 3 is a part sectional side view of one of the interlocking members, showing its inner form. Fig. 4 is an end view of the member shown in Fig. 3. Fig. 5 is a side view of another interlocking member designed to engage with the member shown in Fig. 3. Fig. 6 is a perspective view of a gravity locking device for use with the coupling shown in Figs. 1 and 2.

The coupling consists of two portions A and B, adapted to interlock. The member A comprises the body shown, having an eye C therein and a head D connected to the said body by a neck E. As indicated in Fig. 1 in dotted lines, the said neck E is but substantially one-fourth the width of the body carrying it and is centrally located on the body, while the head D referred to is about one-half the thickness of the body A and projects each side of the neck E. It will be seen also by reference to Figs. 2 and 5 that as viewed sidewise the neck extends from the bottom of the body upward about two-thirds the height of the latter and that the head at the bottom is substantially flush with the neck and body and that its upper portion extends beyond the upper surface of the neck, but does not arise as high as said body and leaves an offset, as indicated. It will be noted, further, that the head is rounded off, as shown in Figs. 1 and 5, though this is by preference and is not necessary for the proper working of the device. The member B referred to is also provided with an eye C' corresponding to C in the part A and has a cylindrical body F of smaller diameter than the part B, there being a shoulder at G. At the extremity of the said cylindrical body is also an annular projection H, forming a shoulder similar to G. The interior of the body F is recessed at J to receive the head D of the member A, the recess being of the form shown in Figs. 3 and 4, so that the said head D can enter it from below and fit up into it, as in Fig. 2. Of necessity the recess opens through to the end of the body F by the vertical slot K, whereby the neck E of the member A may also be entered to form the complete coupling, Fig. 2. In Fig. 4 the letter J indicates the recess as it is formed to admit the head D, also shown in dotted lines, the latter being of oval form while the recess must of course have straight sides, as viewed in that figure.

When entered as described, some means must be provided for holding the parts together, and I accomplish this in the use of a sleeve L, which is designed to fit loosely upon the cylindrical portion F between the annular shoulders G and H described, these preventing end movement of the sleeve, though the latter is perfectly free to turn upon the said portion F. Said sleeve is preferably formed of one piece of metal bent into the desired form, with its ends brought together, as in Fig. 6, and secured as by riveting or other good means. The ends are made very thick, so as to be heavier at that part of the sleeve, and opposite these the sleeve is provided with a notch M, which, as shown in Fig. 1, is so positioned as to normally expose that portion of the cylinder F lying immediately above the recess J, this being likewise shown in Fig. 2. If it is desired to eliminate the weight feature, the sleeve can be shifted by hand to expose or close the recess J. The weight of the ends of the sleeve normally holds said sleeve in the position shown in the figures last named, and when lying thus the head D and neck E will in consequence rest upon the sleeve where its ends are connected, thus being also indicated in Fig. 2, thereby holding these members in place within the body F.

When it is desired to separate the members A and B, the sleeve is grasped by its connected ends and turned upon the portion F one-half of a revolution, thereby bringing the notch M beneath the recess J. The support for the part A, being removed, allows that member to drop out of the part B and the device is uncoupled. When making a coupling, the same movement is imparted to the sleeve to open the recess J, as before, the head D is inserted, and the sleeve liberated, which at once falls by its own weight to the position shown in Fig. 2. By having the recess J open at the bottom of the cylinder F the part A can uncouple by its own weight when released in the manner described. However, it is to be understood that the entire coupling could be turned over with the recess J opening out at the top, so that the part A could then be lifted out, the position of the notch M being changed so as to close the recess as before. I merely state this in order to show that changes may be made in the coupling without sacrificing the spirit of the invention.

The notch M of the sleeve is of course made sufficiently large to readily permit the head D to pass out of its recess immediately the sleeve is turned, as will be understood.

The purpose of my invention, as may be gained from the foregoing, is to provide a coupling of the character described, using a latch or locking device for preventing separation of the two parts, said latch being operated to lock the parts together by the force of gravity, although the said locking device, if desired, can be merely a sleeve without the weight, but with sufficient friction on the member B to remain wherever placed by the operator, and in this way the same end can be accomplished. In this way a fewer number of elements are employed, with the additional advantage that no springs are necessary and, further, that no machine-work whatever is needed in making or assembling the coupling complete. The parts are either cast or drop-forged, a rivet being all that is required to complete the sleeve after that member has been placed in position.

I claim—

1. A coupling of the character described comprising three members, two of them adapted to interlock transversely, the third member being carried by one of the two first said means and operated by gravity to lock the said two members together or preventing voluntary separation thereof.

2. In a device of the class described, two coupling members adapted to interlock in a transverse direction, and means permanently carried by one of the members and fitting entirely around the same and adapted to support the other member, there being a transverse opening through the means, for exposing the last-named member while maintaining a relatively fixed position with respect to longitudinal movement on the member carrying it to permit said last-named member to pass out of and leave its companion.

3. A coupling of the character described comprising two interlocking members adapted for separation in a transverse direction and a third member carried on one of the members for inclosing both said third member acting by gravity to inclose said members and adapted when given a half-revolution to permit of uncoupling the members, the movement of such revoluble member taking place in a fixed position relative to the length of the member carrying it.

4. In a coupling, two interlocked members separable in a transverse direction and a gravity-operated member carried by one of the members and inclosing both when both are connected, the said third member adapted when operated by the force of gravity to hold the first two members in connected relation or permit separation when moved against the force of gravity.

5. In a coupling, two interlocked members separable in a transverse direction, a third member carried wholly by one of the said interlocking ones and serving when in one position to lock both members from becoming separated and to permit separation of the members when altered in position, said third member revoluble on the member carrying it without changing its position relatively to the length of the last-named member.

6. A coupling comprising two members arranged and adapted to interlock with one another there being a socket in one and a tongue on the other, a sleeve carried on the socket member and adapted for revoluble movement thereon, there being an opening in the sleeve to permit passage of the tongue of the other member therethrough into the socket member when the said opening is in register with the socket of the member, the sleeve being normally in position to close the socket-opening.

7. A coupling comprising a grooved member, a member having a tongue adapted to enter and engage the grooved member and adapted for separation only in a transverse direction, and a revoluble sleeve rotatably mounted on one of the members, there being a notch in said sleeve adapted to register with the groove of the said grooved member, said sleeve being weighted to normally keep the notch out of register with said groove to prevent separation of the coupled members.

8. In a coupling of the character described, two members adapted to interlock and separable in a transverse direction, a sleeve carried by one of said members and adapted to turn upon the same and surrounding the interlocking portions, the opposite member resting thereon, the sleeve being weighted to retain a normal position, there being a notch in the sleeve opposite the weighted portion thereof for permitting separation of both members when the notch is brought into register with the member resting upon said sleeve, as set forth.

9. A coupling of the character described comprising two interlocking members adapted for separation in a transverse direction, there being a transverse recess extending part way through one of said members, said recess opening through the bottom of said member substantially as described, the opposite member adapted to enter said recess from below, and a sleeve carried on the recessed member and adapted to close the recess to prevent the opposite member from falling out, there being a weight on said sleeve to retain it in a position to prevent separation, there also being a notch in the sleeve for permitting the opposite member leaving the recess when said notch is brought into register with said recess, substantially as set forth.

10. A coupling comprising two interlocking members adapted for separation in a transverse direction and a gravity-operated device inclosing the two members and normally preventing separation in said transverse direction.

11. A coupling comprising two separate interlocking members and a third member carried by one of them and surrounding both when interlocked, there being a notch in said third member for the purposes described, said third member being weighted to normally hold the notch out of register with the place of separation of the members.

12. In a coupling, a member for connection with a car, a gravity-operated member carried thereon and surrounding it and shiftable on said member, and a third member for connection with a car and adapted to engage the first member, the shiftable member adapted to inclose both the first and third members for keeping them interlocked but adapted also to permit the release of the said engaged members, one from the other, when the shiftable member is operated against the force of gravity.

13. In a coupling a member for connection with a car, a second member connected with another car and adapted for engagement with the first and having a tongue with an enlargement at its extremity there being a socket in the first member to receive it, a third member surrounding the first member, there being a notch therein to register with the socket of the said first member to admit the tongue and to permit its removal, said third member being weighted to normally hold said notch out of register with the socket and tongue.

14. A coupling comprising a member having a substantially vertical T-shaped socket therein, a second member having a correspondingly-shaped tongue to engage said socket, the socket and tongue extending transversely of the respective members, a revoluble sleeve carried by and inclosing the socket member, there being a notch in said sleeve to correspond with the socket and tongue and register therewith to permit withdrawal of the tongue, and a weight on the sleeve to normally keep the notch out of register with the socket and interlocking tongue.

15. In a coupling a member having a substantially T-shaped transverse socket extending part way through the same, a second member having a correspondingly-shaped tongue for engaging the socket, a sleeve surrounding the socket member and normally closing said socket to retain the tongue therein and a weight for holding the sleeve in that position, there being a groove in which the sleeve seats and turns substantially as described.

16. In a coupling, a transversely-socketed member, a companion member having a tongue to transversely engage the same and a revoluble sleeve surrounding both members when engaged the same operated by gravity to cover the members at their engaging ends.

17. A coupling comprising two transversely-locking separable members and a gravity-operated sleeve carried by and inclosing one of the members and normally adapted to close the opening into which the opposite member enters.

18. A coupling of the character described comprising a member having a socket extending up thereinto from below and communicating with and forming part of a narrow socket opening through the end of the member, a second member having a head at one end to enter the socket from below and having a narrow neck connecting the head with the main body, the neck entering the narrow opening in the end of the first-described member, and a third member for closing the opening of the socket to prevent separation of the said first and second members.

19. A coupling comprising two members adapted to interlock in a transverse direction as by a transverse opening in one member, and a tongue on the other member to enter such opening, and a sleeve surrounding one of the members and adapted for rotary movement thereon in one plane to close the opening against the removal of the tongue and also for exposing the opening to permit removal of said tongue therefrom.

20. A coupling comprising two members, one having a socket in its under side, the other having a head to enter said socket from below, and a member for closing the opening of the socket to prevent separation of the members.

21. A coupling comprising a member having a socket extending partially therethrough in a transverse direction, a second member for entering it, and a sleeve upon one of the members for closing the opening of the socket for normally holding the two members together.

22. A coupling comprising a member having a socket extending partially therethrough in a transverse direction as described, a second member for entering it, and a sleeve for closing the opening of the socket for normally holding the two members together.

23. A coupling comprising two members, one having a socket in its side, the other having a head to enter it, and a member for closing the opening of the socket to prevent separation of the members, there being a notch in the sleeve to register with the socket to permit the said second member to leave the first as described.

24. In a coupling of the class described, the body F having a socket J therein and the opening K therein connecting with socket J, the body A having the head D to enter the said socket J of the body F, the head having the neck E for entering the opening K substantially as described, and the rotatable gravity-operated sleeve L having the notch M therein to register with the socket J and opening K for the purposes set forth.

In testimony whereof I affix my signature in presence of two witnesses.

JAMES L. FRAZIER.

Witnesses:
E. J. ABERSOL,
L. M. THURLOW.